(12) United States Patent
Thomsen et al.

(10) Patent No.: US 6,249,687 B1
(45) Date of Patent: Jun. 19, 2001

(54) DUAL MODE MOBILE PHONE USING A MULTIPLEX TYPE FILTER

(75) Inventors: Pia Thomsen, Aabybro; Niels Ole Norholm, Aalborg, both of (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/264,940

(22) Filed: Mar. 9, 1999

(30) Foreign Application Priority Data

May 19, 1998 (EP) .................................................. 98109047

(51) Int. Cl.[7] .............................. H04B 1/38; H04L 27/06
(52) U.S. Cl. ......................... 455/553; 455/552; 375/316; 375/343
(58) Field of Search ..................................... 455/553, 552, 455/550, 83, 80, 81, 90, 575, 189.1, 193.2, 188.1, 133, 182.1, 182.2, 179.1, 180.1, 150.1; 375/343, 316, 344; 333/126, 129, 132

(56) References Cited

U.S. PATENT DOCUMENTS 5,388,123 * 2/1995 Uesugi et al. ........................ 375/234
5,884,149 * 5/1999 Jaakola ............................. 455/553 X
6,069,923 * 5/2000 Ostman et al. ....................... 375/316
6,134,427 * 10/2000 Hughes .......................... 455/189.1 X

FOREIGN PATENT DOCUMENTS 0 355973 B1  12/1995 (EP) .

* cited by examiner

Primary Examiner—Tracy Legree
(74) Attorney, Agent, or Firm—Michael J. Striker

(57) ABSTRACT

The mobile phone is equipped for at least two frequency bands and includes an antenna coupled to a multiplex type filter. The multiplex type filter contains at least two disparate bandpass filters for separate reception or transmission frequency bands. A first bandpass filter of the at least two disparate bandpass filters has as a passband a first frequency band. A second bandpass filter of the at least two disparate bandpass filters has as a passband a second frequency band. An input impedance of the first bandpass filter in the second frequency band is higher than an input impedance of the second bandpass filter in the second frequency band, and an input impedance of the second bandpass filter in the first frequency band is higher that an input impedance of the first bandpass filter in the first frequency band, so that coupling of signal power at frequencies in the first frequency band to the second bandpass filter and coupling of signal power at frequencies in the second frequency band to the first bandpass filter is essentially reduced.

14 Claims, 5 Drawing Sheets

DUAL MODE MOBILE PHONE USING A MULTIPLEX TYPE FILTER

BACKGROUND OF THE INVENTION

Mobile phones for at least two frequency bands are already known. The Motorola Micro Tac 8900 mobile phone provides automatic shifting between the GSM 900 MHz band (global system for mobile communications) and the GSM 1800 MHz band.

From the EP 0 355 973 B1, a digital mobile phone is known. The digital mobile phone includes an antenna, a receiver input for receiving signals on a first frequency, and a transmitter output for transmitting signals on a second frequency, different from the first frequency. The digital mobile phones comprise a duplex type filter, having a reverse attenuation from the transmitter output to the receiver input. The duplex type filter is used to couple the antenna to said receiver input and transmitter output. The duplex type filter replaces thereby an antenna switch to couple the antenna to the receiver and the transmitter respectively, and its control logic.

SUMMARY OF THE INVENTION

In a mobile phone a duplex type filter and more generally a multiplex type filter may advantageously be used either in a multiband receiver or a multiband transmitter chain to reduce circuit complexity by saving switches and the accompanying control logic in the multiband receiver or transmitter chain and therefore to save space on the printed circuit board and costs.

Using known filter technologies as e. g. Surface Acoustic Wave (SAW) filters, it could be difficult to realize duplex type filters or multiplex type filters having widely separated passbands. Therefore, it may be a problem to secure high input impedance for the disparate bandpass filters in frequency bands outside of the corresponding passband. It is therefore an advantage, to use a matching circuit transforming a low input impedance of the corresponding bandpass filter to a high input impedance in the passbands of the other bandpass filters utilized in the multiplex type filter.

By using a transmission line for the matching circuit, circuit complexity may be further reduced and costs for unnecessary circuit components can be saved.

BRIEF DESCRIPTION OF THE DRAWINGS

Exemplary embodiments of the invention are shown in the figures and explained in greater detail in the description below.

DETAILED DESCRIPTION

Figure 1:
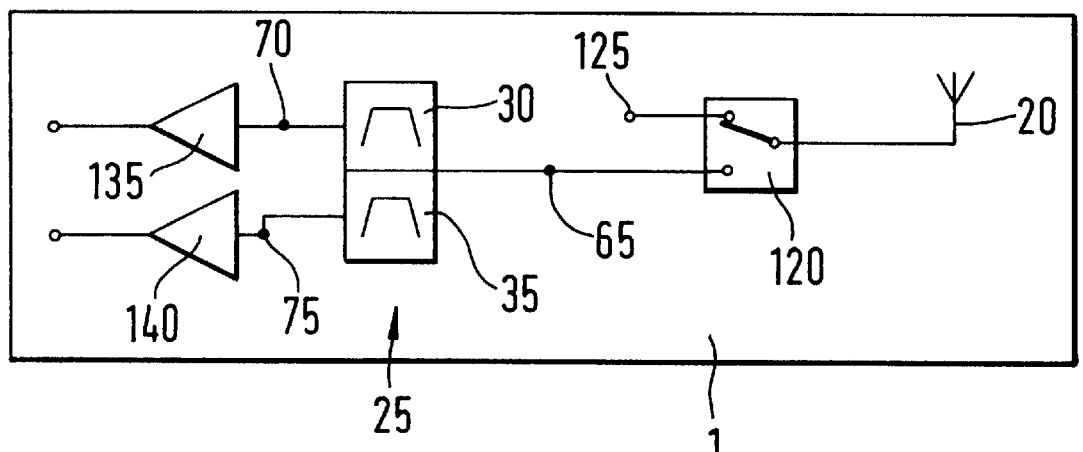
FIG. 1 shows a block diagram of a first embodiment of the invention in a reception line a of mobile phone.

FIG. 1 shows a block diagram of a first embodiment of the invention. In FIG. 1, 1 designates a mobile phone comprising a multiplex type filter 25 having a first bandpass filter 30 and a second bandpass filter 35. The multiplex type filter 25 in FIG. 1 therefore constitutes a duplex type filter. A common input 65 of the multiplex type filter 25 is connectable to an antenna 20 by a switch 120. A first transmitter port 125 is also connectable to the antenna 20 via the switch 120. Transmitter stages are connected to the first transmitter port 125 and are not shown in FIG. 1. The multiplex type filter 25 has a first output 70 and a second output 75 whereby the first output 70 is the output of the first bandpass filter 30 and the second output 75 is the output of the second bandpass filter 35. The common input 65 of the multiplex type filter 25 is shared by both bandpass filters 30, 35. Via the first output 70, the first bandpass filter 30 is connected to a first amplifier stage 135 and to further reception states not shown in FIG. 1. Via the second output 75, the second bandpass filter 3S is connected to a second amplifier stage 140 and further reception stages not shown in FIG. 1.

Figure 8:
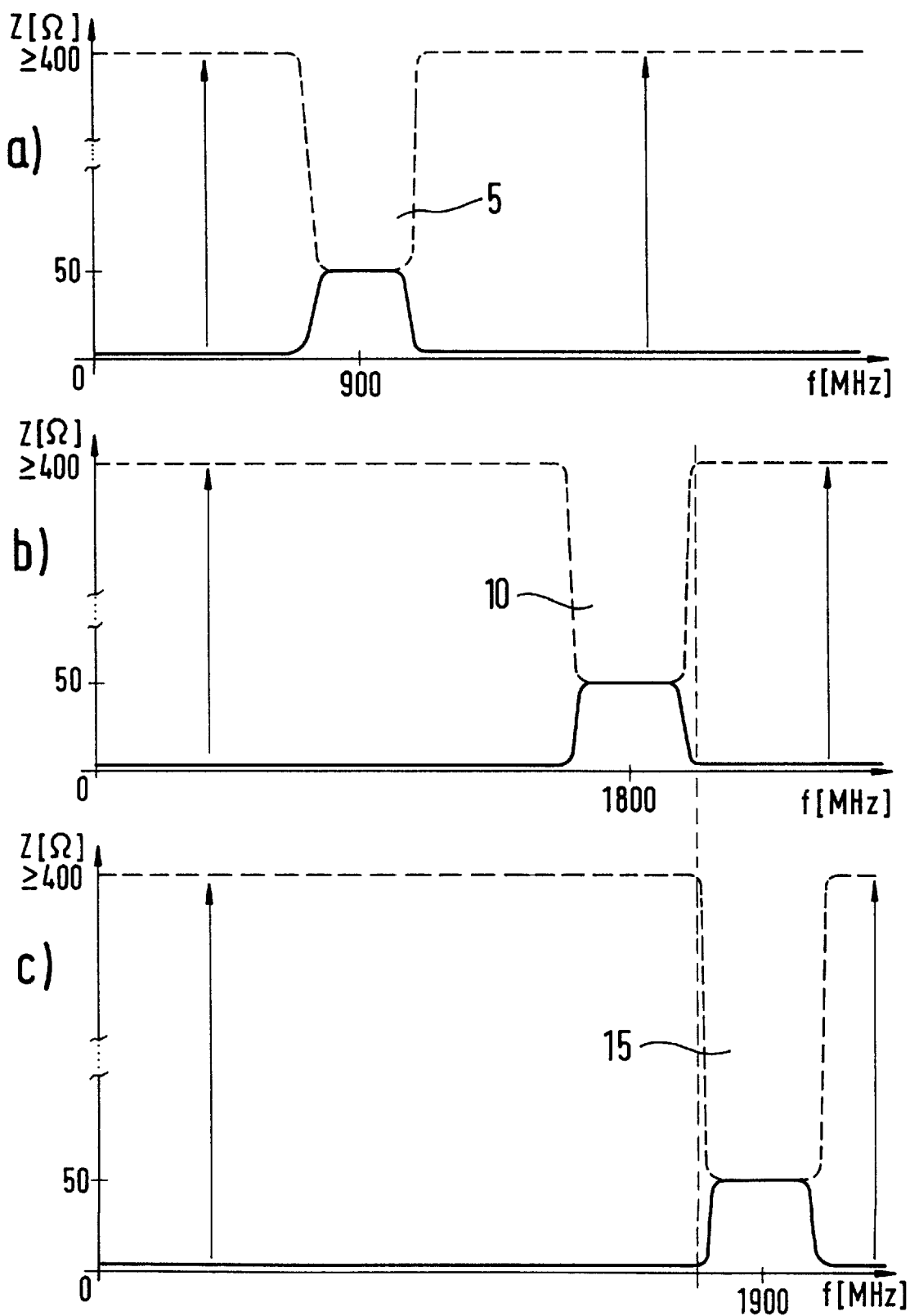
FIG. 8 frequency diagrams for the impedance of the bandpass filters of a triplex type filter.

The first bandpass filter 30 permits reception in a first frequency band 5 which is shown in FIG. 8a). The first frequency band 5 is the GSM 900 MHz frequency band. More precisely, the mobile phone 1 would receive signals in the first frequency band 5 at frequencies of approximately 947 MHz and transmit signals at frequencies of approximately 890 MHz via the antenna 20. The second bandpass filter 35 permits reception of signals via the antenna 20 in a second frequency bald 10 at approximately 1800 MHZ as shown in FIG. 8b), so in the GSM 1800 MHz band. The reception and transmission frequencies in the second frequency band 10 are separated in a similar manner as explained for the first frequency band 5. The first and the second frequency bands 5, 10 do not overlap and are widely separated in frequency. The first frequency band 5 is the passband of the first bandpass filter 30, and the second frequency band 10 is the passband of the second bandpass filter 35.

The switch 120 is controlled by a control logic not shown in FIG. 1 to connect the antenna 20 to the receiving or the transmitting paths according to the requirements during a telephone call.

According to FIG. 8a) the first bandpass filter 30 presents an input impedance Z of 50Ω to the antenna 20 in the first frequency band 5. This impedance is adapted to the impedance of the antenna 20. The dotted line in FIGS. 8a), b), and c) shows the filter input impedance Z as a function of the frequency f. So the first bandpass filter 30 has a high input impedance Z of some hundred Ohms in the second frequency band 10. The second bandpass filter 35 presents an input impedance Z of 50Ω to the antenna 20 in the second frequency band 10 and a high input impedance Z of some hundred Ohms in the first frequency band 5.

Figure 2:
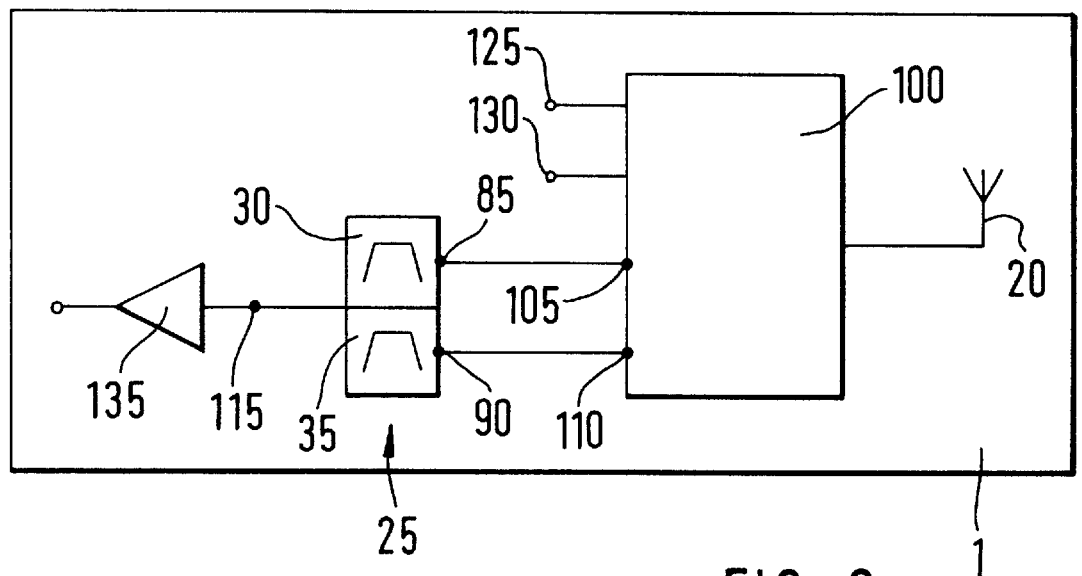
FIG. 2 is a block diagram of a second embodiment of the invention in a reception line of a mobile phone.

In FIG. 2, a block diagram of a second embodiment of the invention is shown. In this embodiment, the antenna 20 of the mobile phone 1 is connectable via an antenna switch circuit 100 to the first transmitter port 125, a second transmitter port 130, a first receiver port 105, and a second receiver port 110. The transmitter ports 125, 130 are input ports of the antenna switch circuit 100 and the receiver ports 105, 110 are output ports of the antenna switch circuit 100. The antenna switch circuit 100 is controlled by a control logic not shown in FIG. 2 and connects the several ports 125, 130, 105, 110 to the antenna 20 according to the requirements during a telephone call. A transmitter line connected to the first transmitter port 125 and the second transmitter port 130 is not shown in FIG. 2. The first reception port 105 of the antenna switch circuit 100 is connected to a first input 85 of the multiplex type filter 25. The second reception port 110 of the antenna switch circuit 100 is connected to a second input 90 of the multiplex type filter 25. Thereby, the first input 85 of the multiplex type filter 25 is the input of the first bandpass filter 30 and the second input 90 of the multiplex type filter 25 is the input of the second bandpass filter 35. The first bandpass filter 30 and the second bandpass filter 35 share a common output 115 of the multiplex type filter 25, which is connected to the first amplifier stage 135 and further reception stages not shown in FIG. 2.

The effect of the multiplex type filters 25 in FIG. 1 and FIG. 2 is the same, only the input and output connection arrangements are different.

Figure 3:
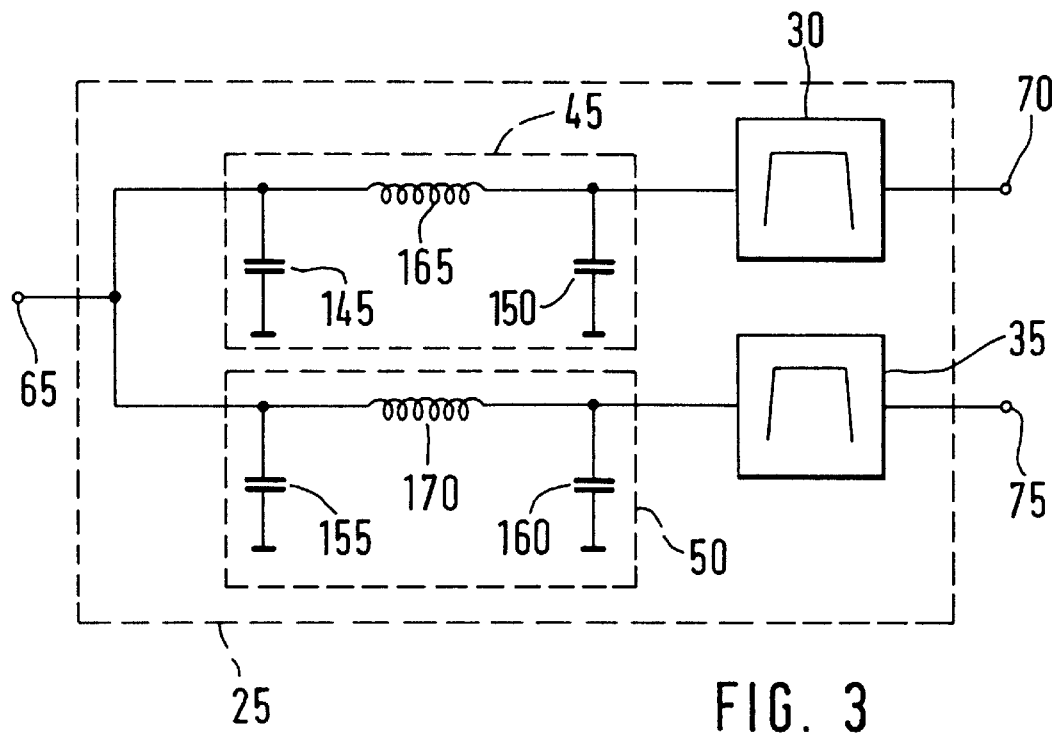
FIG. 3 is a first circuit for a duplex type filter.

FIG. 3 shows the multiplex type filter 25 of FIG. 1 in more detail. In FIG. 3, the common input 65 of the multiplex type filter 25 is connected to the first bandpass filter 30 via a first matching circuit 45 and to the second bandpass filter 35 via a second matching circuit 50. Thereby the first matching circuit 45 comprises a first inductor 165. At its first end the first inductor 165 is connected to the common input 65 and via a first capacitor 145 to ground. At its second end, the first inductor 165 is connected to the first bandpass filter 30 and via a second capacitor 150 also to ground. The second matching circuit 50 comprises a second inductor 170. At its first end, the second inductor 170 is connected to the common input 65 and via a third capacitor 155 to ground. At its second end, the second inductor 170 is connected to the second bandpass filter 35 and via a second capacitor 160 also to ground.

Without using the first matching circuit 45, the input impedance Z of the first bandpass filter 30 depends on the frequency f according to the continuous line in FIG. 8a) This means, that for frequencies outside the first frequency band 5 the input impedance Z of the first bandpass filter 30 is approximately zero. Therefore, signals with frequencies of the second frequency band 10 would easily be coupled to the first bandpass filter 30 and therefore generate loss in the signal strength of the signal passed through the second bandpass filter 35, adapted to the antenna impedance of 50Ω in the second frequency band 10. The first matching circuit 45 transforms the low input impedance Z of the first bandpass filter 30 outside the first frequency band 5, at least in the second frequency band 10, to a high input impedance Z of some 100 Ohms. This transformation is indicated in FIG. 8a) by arrows. Therefore, coupling of signals at frequencies outside the first frequency band 5, especially in the second frequency band 10, into the first bandpass filter 30 is strongly reduced. In the first frequency band 5, the first matching circuit 45 leaves the impedance Z of the first bandpass filter 30 at the antenna impedance of 50Ω.

In FIG. 8b), the input impedance Z of the second bandpass filter 35 is shown as a function of the frequency f. The continuous line in FIG. 8b) shows the input impedance Z of the second bandpass filter 35 as a function of the frequency f without using the second matching circuit 50. Thereby, the input impedance Z of the second bandpass filter 35 equals 50Ω in the second frequency band 10 and equals approximately zero outside the second frequency band 10. The second matching circuit 50 transforms the input impedance Z of the second bandpass filter 35 at frequencies outside the second frequency band 10, especially in the first frequency band 5, to high values as indicated by arrows in FIG. 8b) and leaves the input impedance Z of the second bandpass filter 35 at approximately 50Ω in the second frequency band 10. Therefore, coupling of signals at frequencies of the first frequency band 5 into the second bandpass filter 35 is strongly reduced. The input impedance Z of the second bandpass filter 35 after the transformation is shown as a dotted line in FIG. 8b).

Figure 5:
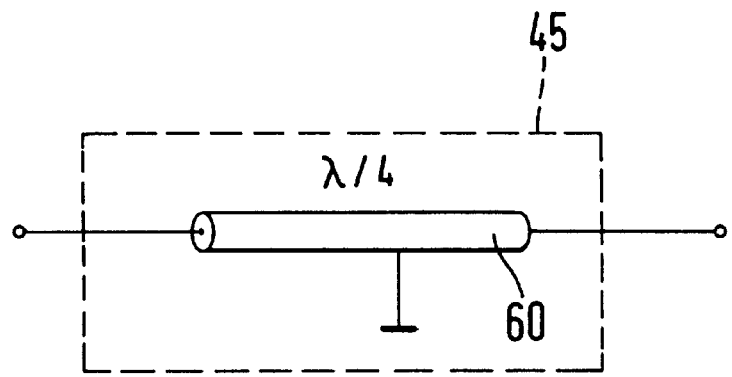
FIG. 5 is a transmission line.

An alternative matching circuit may be constituted by a transmission line 60 as shown in FIG. 5 for the first matching circuit 45 as an example. A transmission line can also be used for the other matching circuits in the multiplex type filter 25. The length of the transmission line 60 is thereby chosen e.g. as a quarter of the wavelength of the center frequency of the frequency band of the corresponding bandpass filter. For the example of FIG. 5, the center frequency of the first frequency band 5 which is the passband of the first bandpass filter 30 is at approximately 900 MHz. Such a transmission line also leaves the input impedance Z in the passband of the corresponding bandpass filter at the antenna impedance of 50Ω and increases the input impedance Z outside the passband of the corresponding bandpass filter to some hundred Ohms, especially in the passbands of the other bandpass filters utilized in the multiplex type filter 25.

The transmission line 60 may be a coaxial cable. The central conductor of the coaxial cable is connected at one end with the common input 65 and at the other end with the corresponding bandpass filter. The outer conductor of the transmission line 60 is connected to ground.

Figure 6:
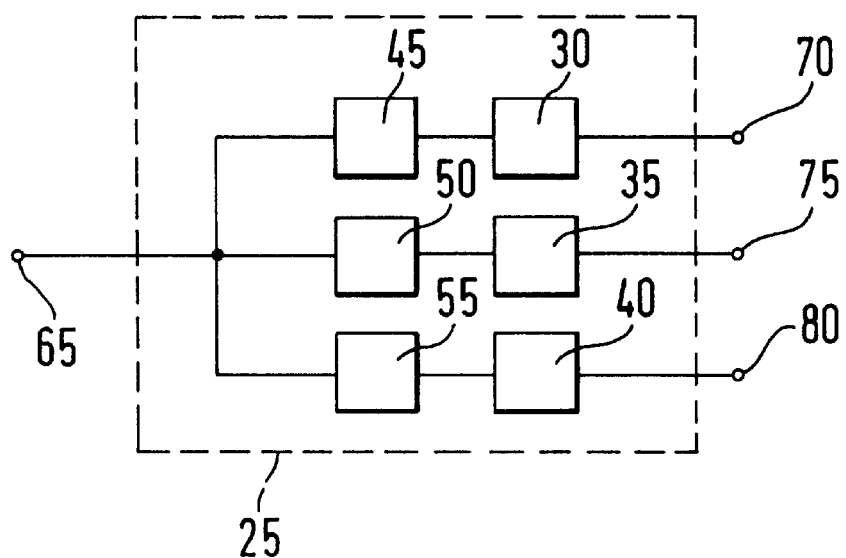
FIG. 6 is a first circuit for a triplex type filter.

FIG. 6 shows an example of a multiplex type filter 25 with three disparate bandpass filters 30, 35, 40 following a matching circuit 45, 50, 55, respectively. In comparison with the above described embodiments, the third bandpass filter 40 is added for a third frequency band 15, the center frequency of which is approximately at 1900 MHz. The third frequency band 15 may be the GSM 1900 MHz band and is the passband of the third bandpass filter 40, separated in frequency from the passbands of the first and second bandpass filters 30, 35, so that the passbands of the first, the second, and the third bandpass filter 30, 35, 40 do not overlap. According to FIG. 1, the embodiment shown in FIG. 6 is an example for a multiplex type filter 25 with a common input 65 and separate outputs. Thereby, in comparison with the embodiment of FIG. 1, the common input 65 additionally is connected to the third bandpass filter 40 via a third matching circuit 55. The output of the third bandpass filter 40 would be a third output 80 of the multiplex type filter 25. The third matching circuit 55 may have a structure as shown in FIG. 3 or FIG. 5. By choosing a transmission line for the third matching circuit 55 the length of the transmission line should be a quarter of the wavelength of the center frequency of 1900 MHz of the third frequency band 15.

FIG. 8c) shows the input impedance Z of the third bandpass filter 40 as a function of the frequency f. The continuous line shows the input impedance Z of the third bandpass filter 40 as a function of the frequency f without the use of the third matching circuit 55. Thereby, in the third frequency band 15, the input impedance Z of the third bandpass filter 40 equals the antenna impedance of 50Ω. outside the third frequency band 15, the input impedance Z of the third bandpass filter 40 equals approximately zero. The third matching circuit 55 transforms the input impedance Z of the third bandpass filter 40 outside the third frequency band 15 to a high impedance, especially in the first and second frequency band 5, 10, as indicated by arrows in FIG. 8c), and leaves the input impedance Z of the third bandpass filter 40 in the third frequency band 15 at approximately 50Ω. Therefore, coupling of signals at frequencies of the first and second frequency bands 5, 10 into the third bandpass filter 40 is strongly reduced. The first and the second matching circuits 45, 50 should transform the input impedance Z of the corresponding first and second bandpass filter 30, 35 to a high value also in the third frequency band 15 to reduce coupling of signals at frequencies of the third frequency band 15 into the first and second bandpass filters 30, 35.

Figure 4:
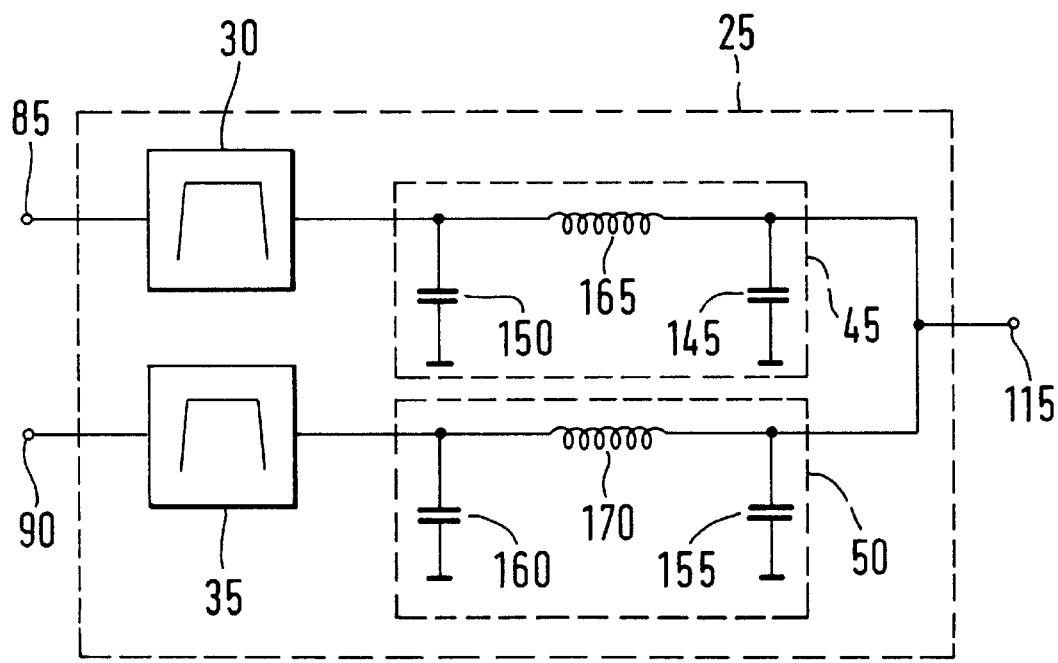
FIG. 4 is a second circuit for a duplex type filter.

FIG. 4 shows the multiplex type filter 25 of the second embodiment described according to FIG. 2 in more detail. The embodiment shown in FIG. 4 corresponds to the embodiment shown in FIG. 3 with two exceptions: First, in FIG. 4 the first matching circuit 45 and the second matching circuit 50 share the common output 115.

Second, in FIG. 4 the first bandpass filter 30 and the second bandpass filter 35 have different inputs whereas the input of the first bandpass filter 30 corresponds to the first input 85 of the multiplex type filter 25 and the input of the second bandpass filter 35 corresponds to the second input 90 of the multiplex type filter 25. The first input 85 and the second input 90 are not connected to each other. The function of the multiplex type filter 25 according to FIG. 4 is the same as the function of the multiplex type filter 25 shown in FIG. 3. The first and/or the second matching circuit 45, 50 may also be constituted by a transmission line, respectively, the length of which corresponding to a quarter of the wavelength of the center frequency of the passband of the preceding bandpass filter. Therefore, the outputs of the first and the second bandpass filter 30, 35 are matched to the common output 115 by the first and the second matching circuit 45, 50.

Figure 7:
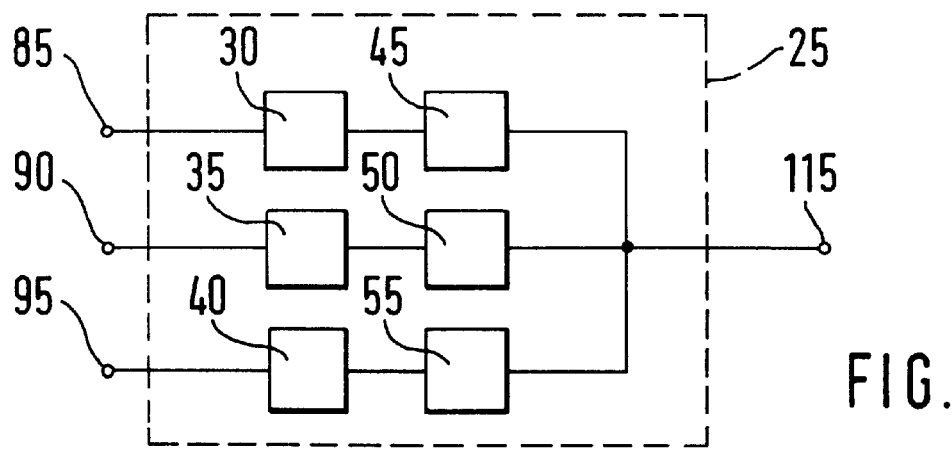
FIG. 7 is a second circuit for a triplex type filter.

According to the second embodiment shown in FIG. 2, FIG. 7 shows an embodiment with a multiplex type filter 25 comprising three bandpass filters 30, 35, 40 with a following matching circuit 45, 50, 55 which may be a transmission line as described above, respectively. Therefore, the embodiment shown in FIG. 7 corresponds to the embodiment shown in FIG. 6 with two exceptions: First, in FIG. 7, the first, the second, and the third matching circuit 45, 50, 55 share tile common output 115. Second, in FIG. 7 the first, the second, and the third bandpass filter 30, 35, 40 have different inputs which are separated from each other and therefore not connected electrically. The input of the first bandpass filter 30 corresponds to the first input 85 of the multiplex type filter 25, the input of the second bandpass filter 35 corresponds to the second input 90 of the multiplex type filter 25 and the input of the third bandpass filter 40 corresponds to a third input 95 of the multiplex type filter 25. Therefore, the outputs of the first, the second and the third bandpass filter 30, 35, 40 are matched to the common output 115 by the first, the second and the third matching circuit 45, 50, 55.

The function of the multiplex type filter 25 shown in FIG. 7 corresponds to the function of the multiplex type filter 25 shown in FIG. 6.

A multiplex type filter 25 with three bandpass filters 30, 35, 40 may be called a triplex type filter.

The embodiments, shown in FIG. 3 and FIG. 4 comprise two bandpass filters, where the first bandpass filter 30 has its passband in the first frequency band 5 and the second bandpass filter 35 has its passband in the second frequency band 10. The multiplex type filter 25 with two bandpass filters could also comprise the first bandpass filter 30 for the first frequency band 5 and the third bandpass filter 40 for the third frequency band 15. Such a multiplex type filter 25 with two bandpass filters could also comprise the second bandpass filter 35 for the second frequency band 10 and the third bandpass filter 40 for the third frequency band 15.

An example of dimensioning corresponding matching filters is given below. Therefore, it is supposed, that the multiplex type filter 25 comprises the second bandpass filter 35 and the third bandpass filter 40. The second bandpass filter 35 in this example would be preceded by the first matching circuit 45 and the third bandpass filter 40 in this example would be preceded by the second matching circuit 50. For the first inductor 165, a value of 3,3 nH is chosen. For the second indicator 170, a value of 2,7 nH is chosen. For the first, the second, the third, and the fourth conductor 145, 150, 155, 160, a value of 3,3 pF is chosen respectively. As a result, the input impedance Z of the second bandpass filter 35, according to FIG. 8b), would be higher than or equal to 400Ω at least in the first frequency band 5 and in the third frequency band 15. According to FIG. 8c), the input impedance Z of the third bandpass filter 40 would be higher than or equal to 400Ω at least in the first frequency band 5 and in the second frequency band 10. The input impedance Z of the second bandpass filter 35 and the third bandpass filter 40 in the corresponding passbands would be approximately equal to the antenna impedance of 50Ω.

To prevent essential signal coupling at frequencies of the passband of one bandpass filter of the multiplex type filter 25 to another bandpass filter of the multiplex type filter 25, the input impedance Z of the other bandpass filter of the multiplex type filter 25 in the passband of the one bandpass filter of the multiplex type filter 25 should be high enough in comparison with the input impedance Z of the one bandpass filter of the multiplex type filter 25 in this passband.

Figure 9:
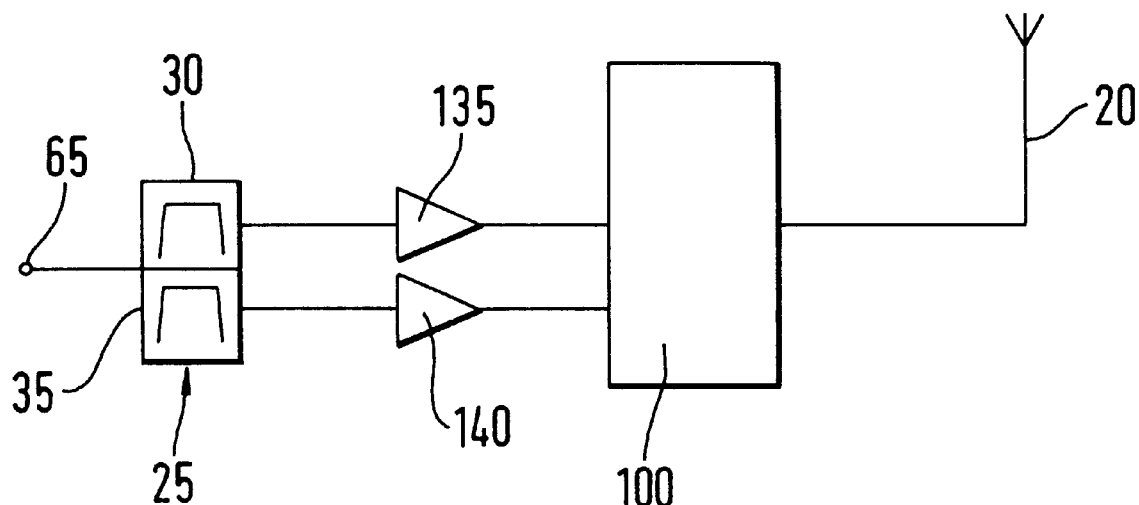
FIG. 9 is a block diagram of mobile phone.
Figure 10:
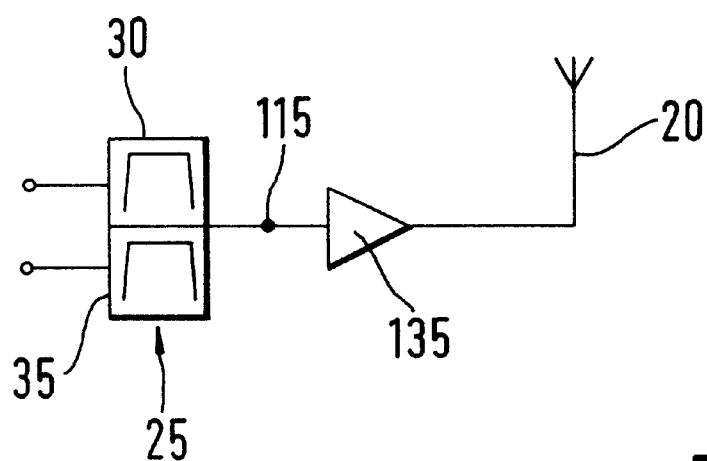
FIG. 10 is a block diagram of fourth embodiment of the invention in a transmitter path of a mobile phone.

According to FIGS. 9 and 10, the multiplex type filter 25 can also be used in the transmitter path of the mobile phone 1. Thereby, FIG. 9 shows the multiplex type filter 25 comprising the first bandpass filter 30 and the second bandpass filter 35 sharing the common input 65 The first bandpass filter 30 is connected to the antenna switch circuit 100 via the first amplifier 133 and the second bandpass filter 35 is connected to the antenna switch circuit 100 via the second amplifier 140. Via the antenna switch circuit 100, the first amplifier 135 or the second amplifier 140 may be connected to the antenna 20. Via the antenna switch circuit 100, the antenna 20 may also be connected to receiver ports not shown in FIG. 9.

FIG. 10 shows the multiplex type filter 25 with the first bandpass filter 30 and the second bandpass filter 35 having separate, electrically not connected inputs and sharing the common output 115. The common output 115 is connected to the antenna 20 via the first amplifier 135.

Concerning the input impedance Z of the corresponding bandpass filters utilized in the multiplex type filter 25 and transformed by a matching circuit, respectively, if necessary, it is also important, to prevent essential signal coupling at frequencies of the passband of one bandpass filter of the multiplex type filter 25 to another bandpass filter of the multiplex type filter 25. Therefore, the input impedance Z of the other bandpass filter of the multiplex type filter 25 in the passband of the one bandpass filter of the multiplex type filter 25 should be high enough in comparison with the input impedance Z of the one bandpass filter of the multiplex type filter 25 in this passband, as described above, even if the input impedance Z of the bandpass filters of the multiplex type filter 25 in their passbands do not have to be adapted to the antenna impedance but to the output impedance of elements preceding the multiplex type filter 25. Matching circuits in the multiplex type filter 25 may also be constituted by transmission lines as described above.

If in the transmitter or receiver path the multiplex type filter 25 is used with bandpass filters sharing a common output, the following amplifier has to be a wideband amplifier, including in its passband the passbands of the bandpass filters of the multiplex type filter 25 used.

Regardless of the use of the multiplex type filter 25 in a transmitter or receiver chain, the desired frequency bands are separated by the bandpass filters included in the multiplex type filter 25. Therefore, switches can be saved to switch the desired frequency band into the transmitter or receiver path of the mobile phone. Such switches produce insertion loss and need a control logic. As narrow bandpass filters for the different frequency bands are needed in any case, they may, according to the invention, be combined to a multiplex type filter and therefore save the switches and there control logic.

The multiplex type filter 25 may be a SAW filter (Surface Acoustic Wave), a stripline filter, a microstrip filter, a multilayer filter, a ceramic filter or may be based on helical resonators.

In all drawings of the described embodiments of the invention, same elements are designated with the same numerals, respectively.

It is also in the scope of the invention to use more than three bandpass filters optionally with a matching circuit, respectively, in the multiplex type filter 25, if more than three frequency bands are required for reception or transmission

What is claimed is:

1. A mobile phone (1) for at least two frequency bands (5, 10), said mobile phone comprising an antenna (20) coupled to a multiplex type filter (25), wherein the multiplex type filter (25) comprises at least two disparate bandpass filters (30, 35) for either separate reception or separate transmission frequency bands (5, 10), said at least two disparate bandpass filters (30, 35) including a first bandpass filter (30) having as a passband a first frequency band (5) and a second bandpass filter (35) having as a passband a second frequency band (10), an input impedance of the first bandpass filter (30) in the second frequency band (10) is higher than an input impedance of the second bandpass filter (35) in the second frequency band (10) and an input impedance of the second bandpass filter (35) in the first frequency band (5) is higher than an input impedance of the first bandpass filter (30) in the first frequency band (5);

whereby coupling of signal power at frequencies in the first frequency band (5) to the second bandpass filter (35) and coupling of signal power at frequencies in the second frequency band (10) to the first bandpass filter (30) is substantially reduced.

2. The mobile phone (1) as defined in claim 1, wherein said multiplex type filter (25) contains a third bandpass filter (40) for a third frequency band (15), separated from the first and second frequency bands (5, 10), the third bandpass filter (40) having as a passband the third frequency band (15), an input impedance of the third bandpass filter (40) in the first and in the second frequency bands (5, 10) is higher than an input impedance of the first bandpass filter (30) in the first frequency band (5) and higher than an input impedance of the second bandpass filter (35) in the second frequency band (10), an input impedance of the first bandpass filter (30) in the third frequency band (15) is higher than an input impedance of the third bandpass filter (40) in the third frequency band (15), an input impedance of the second bandpass filter (35) in the third frequency band (15) is higher than an input impedance of the third bandpass filter (40) in the third frequency band (15);

whereby coupling of signal power at frequencies in the first and second frequency bands (5, 10) to the third bandpass filter (40) and coupling of signal power at frequencies in the third frequency band (15) to the first and second bandpass filters (30, 35) is substantially reduced.

3. The mobile phone (1) as defined in claim 2, wherein the third frequency band (15) at approximately 1900 MHz.

4. The mobile phone (1) as defined in claim 3, wherein the third frequency band (15) is a 1900 MHz GMS band.

5. The mobile phone (1) as defined in claim 1, wherein the first frequency band (5) is at approximately 900 MHz and the second frequency band (10) is at approximately 1800 MHz.

6. The mobile phone (1) as defined in claim 5, wherein the first frequency band (5) is a 900 MHz GMS band.

7. The mobile phone (1) as defined in claim 5, wherein the second frequency band (10) is a 1800 MHz GMS band.

8. The mobile phone as defined in claim 1, wherein in the multiplex type filter (25) at least one of the bandpass filters (30, 35, 40) follows a matching circuit (45, 50, 55), the matching circuit (45, 50, 55) transforming a low input impedance of said at least one of the bandpass filters (30, 35, 40) to a high input impedance in at least those of the frequency bands (5, 10, 15) different from the passband of said at least one of the bandpass filters (30, 35, 40).

9. The mobile phone (1) as defined in claim 8, wherein the matching circuit (45, 50, 55) is a transmission line (60).

10. The mobile phone (1) as defined in claim 9, wherein the transmission line (60) has a length approximately equal to a quarter of the wavelength of a center frequency of the passband of the corresponding bandpass filter (30, 35, 40).

11. The mobile phone (1) as defined in claim 1, wherein the multiplex type filter (25) has one common input (65), the input (65) is shared by the at least two bandpass filters (30, 35), and the multiplex type filter (25) has an output (70, 75) for each of the at least two bandpass filters (30, 35) respectively.

12. The mobile phone (1) as defined in claim 1, wherein the multiplex type filter (25) has one common output (115), the at least two bandpass filters (30, 35) of the multiplex type filter (25) share a common output (115), and the multiplex type filter (25) has an input (85, 90) for each of the at least two bandpass filters (30, 35), respectively.

13. The mobile phone (1) as defined in claim 1, wherein the multiplex type filter (25) is a surface acoustic wave filter.

14. The mobile phone (1) as defined in claim 1, wherein the multiplex type filter (25) is a strip line filter, a microstrip filter, a multilayer filter, a ceramic filter or is based on helical resonators.

* * * * *